I. BATES.
DIAGRAM FOR TEACHING PENMANSHIP.
No. 44,778. Patented Oct. 25, 1864.
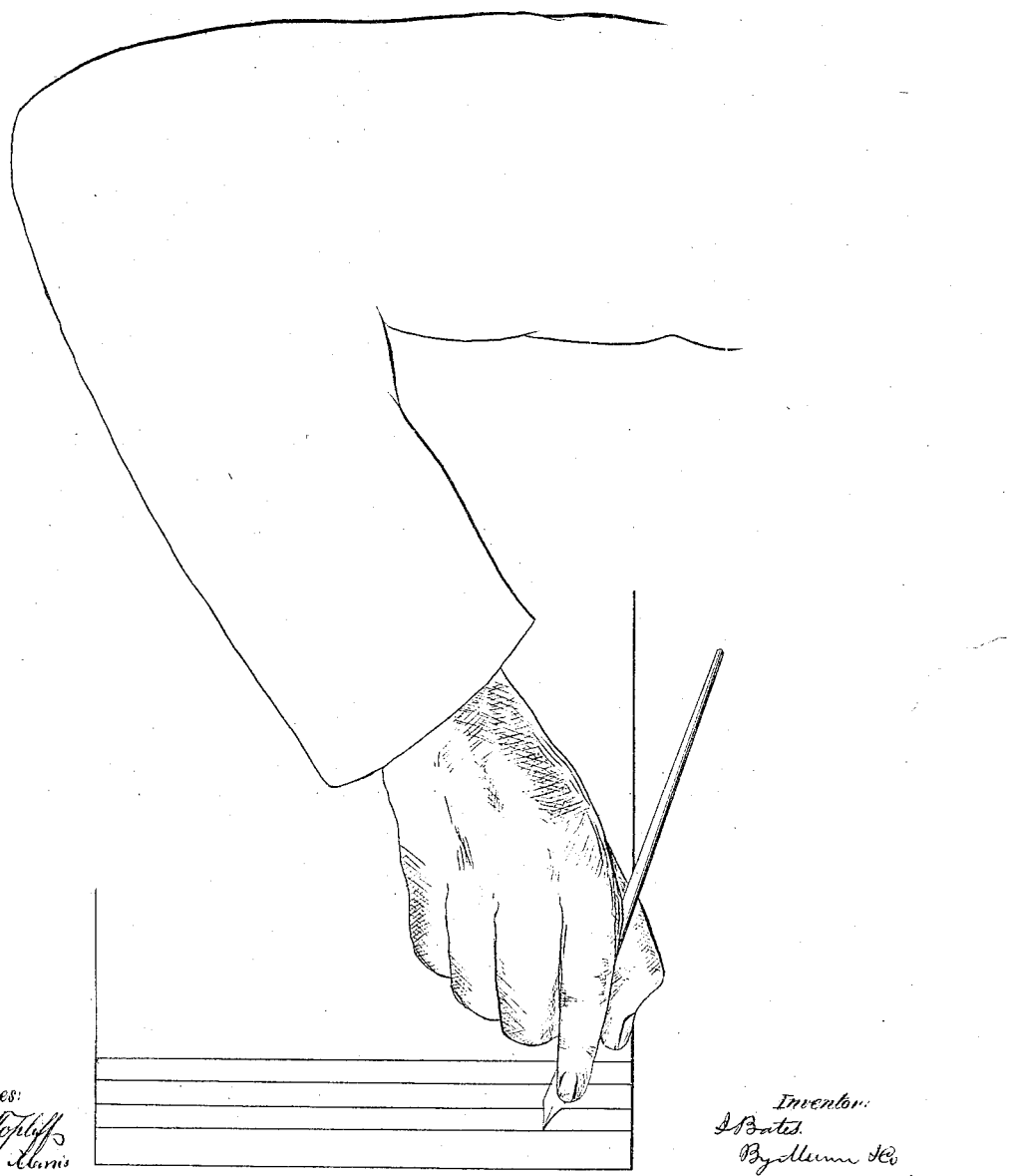

UNITED STATES PATENT OFFICE.

ISAAC BATES, OF POUGHKEEPSIE, NEW YORK.

DIAGRAM FOR TEACHING PENMANSHIP.

Specification forming part of Letters Patent No. 44,778, dated October 25, 1864.

*To all whom it may concern:*

Be it known that I, ISAAC BATES, of Poughkeepsie, in the county of Dutchess and State of New York, have invented a new and useful Improvement in Teaching Penmanship; and I do hereby declare that the following is a full, clear, and exact description thereof, which will enable others skilled in the art to fully understand and use the same, reference being had to the accompanying drawing, forming part of this specification, said drawing representing a diagram showing the correct position of the arm, the hand, and the pen in writing.

This invention consists in the employment or use in teaching penmanship of a diagram representing the correct position of the arm, hand, and pen, in such a manner that the student is enabled by placing the diagram on the table and his arm over it to find at once and without further instruction the most approved position for writing.

The diagram which I use is fully represented in the accompanying drawing, and will be readily understood from the following description: I place the body with the right side to the table, keeping the upper part of the arm at an angle of ninety degrees (more or less) toward the edge of the table. The elbow is bent to an angle of about sixty degrees, and the wrist is slightly turned out to bring the pen-holder in a position to point over the right shoulder of the writer. By this position of the arm the elbow forms the fulcrum of the hand, and a perfect "muscular motion" is obtained.

The penholder I place between the thumb and forefinger, the forefinger lying upon the surface of the holder, the second finger falling gently under and crossing at its joint, the holder being opposite to or below the knuckle joint. By this position of the hand and arm, I find the writing can be accomplished in the easiest and most perfect manner, though other teachers may recommend a different position, and indeed for some students it may be advisable to change the position of the arm or hand. I do not wish to confine myself therefore to any particular position of the arm or hand in teaching penmanship, but I reserve the right to change the angle of the arm or wrist, or the position of the pen in my diagram as I may find desirable.

I claim as new and desire to secure by Letters Patent—

The employment or use in teaching penmanship of a diagram representing the correct position of the arm, hand, and pen, substantially such as herein shown and described, and for the purpose set forth.

I. BATES.

Witnesses:
 JAMES SMITH, Jr.,
 M. D. WILLEN.